(12) United States Patent
Stancu

(10) Patent No.: US 11,052,755 B2
(45) Date of Patent: Jul. 6, 2021

(54) COMPOUND SPRING FOR CAPLESS FUEL DOOR

(71) Applicant: Martinrea International US Inc., Auburn Hills, MI (US)

(72) Inventor: Sorin Stancu, Dearborn, MI (US)

(73) Assignee: Martinrea International US Inc., Auburn Hills, MI (US)

(*) Notice: Subject to any disclaimer, the term of this patent is extended or adjusted under 35 U.S.C. 154(b) by 0 days.

(21) Appl. No.: 16/851,829

(22) Filed: Apr. 17, 2020

(65) Prior Publication Data

US 2021/0008976 A1 Jan. 14, 2021

Related U.S. Application Data

(60) Provisional application No. 62/872,743, filed on Jul. 11, 2019.

(51) Int. Cl.
  B60K 15/04 (2006.01)

(52) U.S. Cl.
  CPC ........ B60K 15/04 (2013.01); *B60K 2015/048* (2013.01); *B60K 2015/0461* (2013.01)

(58) Field of Classification Search
  CPC .............. B60K 15/04; B60K 2015/048; B60K 2015/0461; B60K 2015/0429; B60K 15/0406; B60K 2015/0451
  USPC ....................................................... 141/349
  See application file for complete search history.

(56) References Cited

U.S. PATENT DOCUMENTS

| 582,097 | A | * | 5/1897 | Roos | ...................... | A47B 27/02 |
| | | | | | | 108/9 |
| 617,429 | A | * | 1/1899 | Trinkler | ................... | A47B 5/04 |
| | | | | | | 108/134 |
| 2,483,758 | A | * | 10/1949 | Douglas | ................. | A47B 96/07 |
| | | | | | | 248/242 |
| 2,483,899 | A | * | 10/1949 | Grasso | ..................... | A47B 5/04 |
| | | | | | | 108/134 |
| 2,663,447 | A | * | 12/1953 | Westcott | ............ | B60K 15/0406 |
| | | | | | | 220/326 |

(Continued)

FOREIGN PATENT DOCUMENTS

| JP | 06-278480 A | 10/1994 |
| JP | 2018-052450 A | 4/2018 |

(Continued)

OTHER PUBLICATIONS

US 9,908,402 B2, 03/2018, Giles et al. (withdrawn)

(Continued)

*Primary Examiner* — Timothy L Maust
*Assistant Examiner* — James R Hakomaki
(74) *Attorney, Agent, or Firm* — Dinsmore & Shohl LLP

(57) ABSTRACT

A capless fuel door assembly including a body pivotally supported within a housing of the vehicle between closed and opened positions. The body includes an exterior projection exhibiting an angled slide. A spring is secured to the housing and includes an extended portion supported against an end stop location of the projection defining a first end of said angled slide in order to exert the body in the closed position, with opening of the body about the pivot causing a decrease in the closing force as the spring portion displaces along said angled slide to a second end to achieve the opened position.

10 Claims, 4 Drawing Sheets

(56) References Cited

U.S. PATENT DOCUMENTS

| | | | | |
|---|---|---|---|---|
| 2,959,806 A * | 11/1960 | Stewart | ............ | E05F 1/1016 |
| | | | | 16/80 |
| 3,133,741 A * | 5/1964 | Garabello | ............ | B60K 15/05 |
| | | | | 280/834 |
| 3,430,380 A * | 3/1969 | Poff | ............ | A01M 23/30 |
| | | | | 43/81 |
| 3,742,868 A * | 7/1973 | Garceau | ............ | A47B 77/10 |
| | | | | 108/39 |
| 3,835,900 A * | 9/1974 | Godbier | ............ | F16K 15/185 |
| | | | | 141/348 |
| 4,762,247 A * | 8/1988 | Temmesfeld | ............ | B60K 15/04 |
| | | | | 220/303 |
| 5,485,871 A * | 1/1996 | Romanek | ............ | B60K 15/04 |
| | | | | 141/312 |
| 5,884,958 A * | 3/1999 | Oddenino | ............ | B60K 15/04 |
| | | | | 296/97.22 |
| 6,779,467 B1 * | 8/2004 | McCoy | ............ | A47B 5/04 |
| | | | | 108/134 |
| 6,793,266 B2 | 9/2004 | Park | | |
| 6,880,594 B1 * | 4/2005 | Benjey | ............ | B60K 15/0406 |
| | | | | 141/350 |
| 6,994,130 B1 | 2/2006 | Gabbey et al. | | |
| 7,182,109 B2 * | 2/2007 | Kolberg | ............ | B60K 15/04 |
| | | | | 137/592 |
| 7,566,089 B2 * | 7/2009 | Alfaro | ............ | B60K 15/05 |
| | | | | 280/853 |
| 7,882,862 B2 * | 2/2011 | DeCapua | ............ | B60K 15/035 |
| | | | | 141/295 |
| 8,991,629 B2 | 3/2015 | Gerdes | | |
| 9,266,428 B2 | 2/2016 | Kobayashi | | |
| 9,393,864 B2 * | 7/2016 | Yamamoto | ............ | B60K 15/04 |
| 10,137,773 B1 | 11/2018 | Song et al. | | |
| 10,226,996 B2 | 3/2019 | Giles et al. | | |
| 2005/0194810 A1 | 9/2005 | Beck | | |
| 2006/0162813 A1 | 7/2006 | Walkowski | | |
| 2010/0072774 A1 * | 3/2010 | Bar | ............ | B60K 15/0406 |
| | | | | 296/97.22 |
| 2012/0217240 A1 | 8/2012 | Dutzi et al. | | |
| 2016/0009173 A1 | 1/2016 | Sperando et al. | | |
| 2017/0015192 A1 | 1/2017 | Abe | | |

FOREIGN PATENT DOCUMENTS

| | | |
|---|---|---|
| KR | 20-1999-0003290 U | 1/1999 |
| KR | 100507644 B1 | 8/2005 |
| KR | 100572634 B1 | 4/2006 |
| KR | 100774766 B1 | 11/2007 |
| KR | 1020150050805 A | 5/2015 |
| WO | 2006/041572 A1 | 4/2006 |

OTHER PUBLICATIONS

International Search Report and Written Opinion issued by the Korean Intellectual Property Office acting as International Searching Authority for International Application No. PCT/US2020/029250 dated Jul. 29, 2020 (15 pages).

* cited by examiner

COMPOUND SPRING FOR CAPLESS FUEL DOOR

CROSS REFERENCE TO RELATED APPLICATIONS

The present application claims the priority of 62/872,743 filed Jul. 11, 2019.

FIELD OF THE INVENTION

The present invention relates generally to a capless fuel door construction for use with a vehicle. More specifically, the present invention discloses utilizing a single or double torsion door springs mounted to the surrounding housing and biased against an inclined surface profile of the pivotally mounted fuel door in order to provide a high degree of initial closing force, the holding force quickly decreasing as continued force is exerted in an opening direction.

BACKGROUND OF THE INVENTION

The prior art is documented with various examples of spring loaded fuel door assemblies.

Park, U.S. Pat. No. 6,793,266, teaches a door assembly with an elastic member for providing a door opening force.

Gabbey U.S. Pat. No. 6,994,130 includes a motorized input in combination with a dual coil spring and door slide configuration (see FIGS. 4 & 7).

The spring configurations in Kobayashi U.S. Pat. No. 9,266,428 are different and are associated with a dual door closure arrangement (combination main flap unit and shutter unit). Similar situation with Giles U.S. Pat. Nos. 9,908,402 and 10,226,996 as well as Dutzi US 2012/0217240.

SUMMARY OF THE PRESENT INVENTION

The present invention discloses a capless fuel door assembly including a body pivotally supported within a housing of the vehicle between closed and opened positions. The body includes an exterior projection exhibiting an angled slide. A spring is secured to the housing and includes an extended portion supported against an end stop location of the projection defining a first end of said angled slide in order to exert the body in the closed position, with opening of the body about the pivot causing a decrease in the closing force as the spring portion displaces along said angled slide to a second end to achieve the opened position.

Additional features include the spring having a pair of torsional end windings with linear end projections received within the housing. An interior window is configured within the housing for receiving the torsional windings.

Other features include an annular end stop surface biases the body in the closed position. The body includes a further support projection which is adapted to being grasped by a user during opening and closing of the door.

A sealing gasket is configured about a perimeter of the body for sealing about the annular end stop surface of the housing in the closed position. The spring further includes any of a plurality of torsional spring profiles and spring coils for achieving the desired closing force.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a compound spring for a capless door and which includes the provision of a compound torsional spring (in the preferred embodiment being depicted as a substantially U shaped component) which is mounted to a proximate location of the housing well and which includes a central extending portion arranged in displacing contact with an inclined projecting plane of the capless door.

As will be further described, the spring/slide interface further includes a limiter/stopper location corresponding with the closed position and, upon being pivoted open, the central extending spring location is repositioned parallel and adjacent the pivotal support for the capless door. The spring to slide configuration provides for a high degree of initial closing bias (such as to counter car wash and/or vacuum induced resistance), with the holding force dropping as the door is opened.

As will be further explained, the present configuration provides clearance around the door hinge to accommodate for tight spaces/packaging and to provide for a high degree of initial closing bias (such as to counter car wash and/or vacuum induced resistance), with the holding force dropping as the door is opened. As further explained, the present configuration provides clearance around the door hinge to accommodate for tight spaces/packaging.

Figure 6:
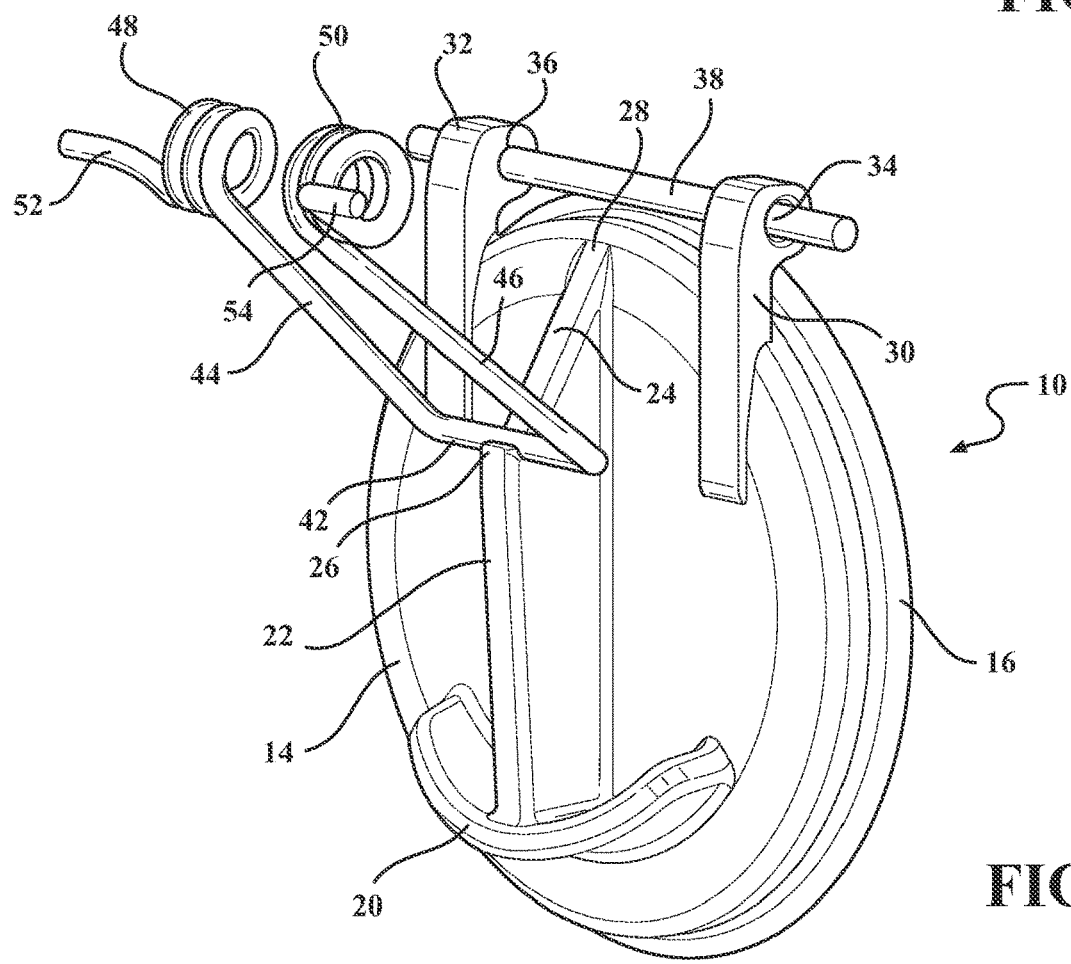
FIG. 6 is a sectional view of the capless door and compound torsional spring in the closed position without the housing tunnel.
Figure 7:
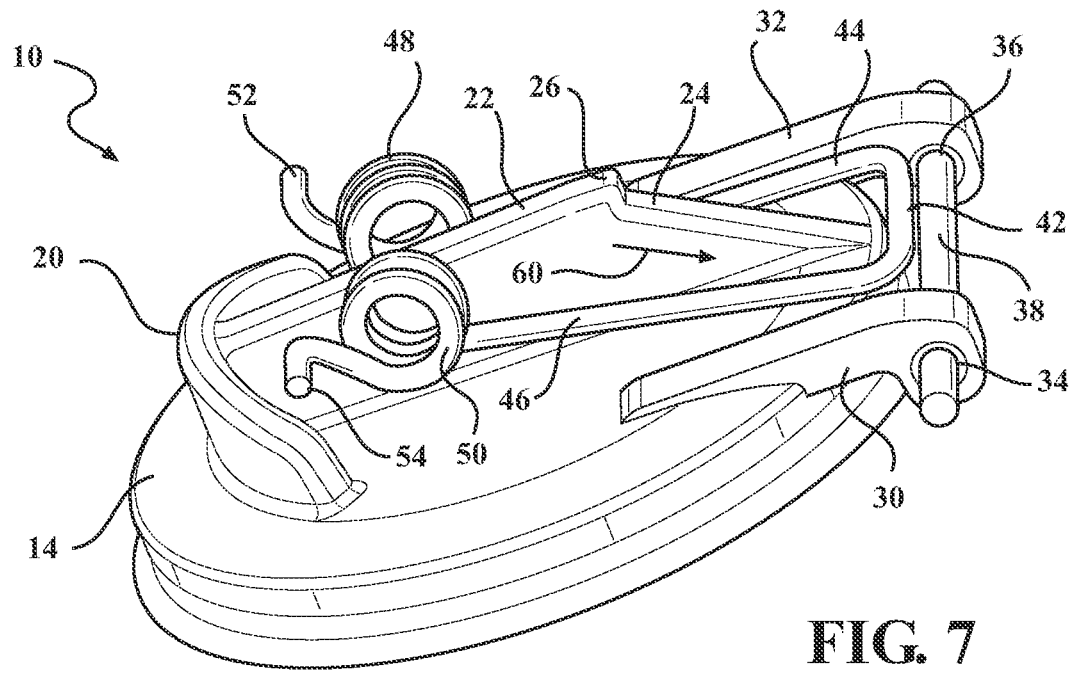
FIG. 7 is a rotated perspective illustration of the capless door and spring in the open position also shown in FIGS. 2-3.
Figure 8:
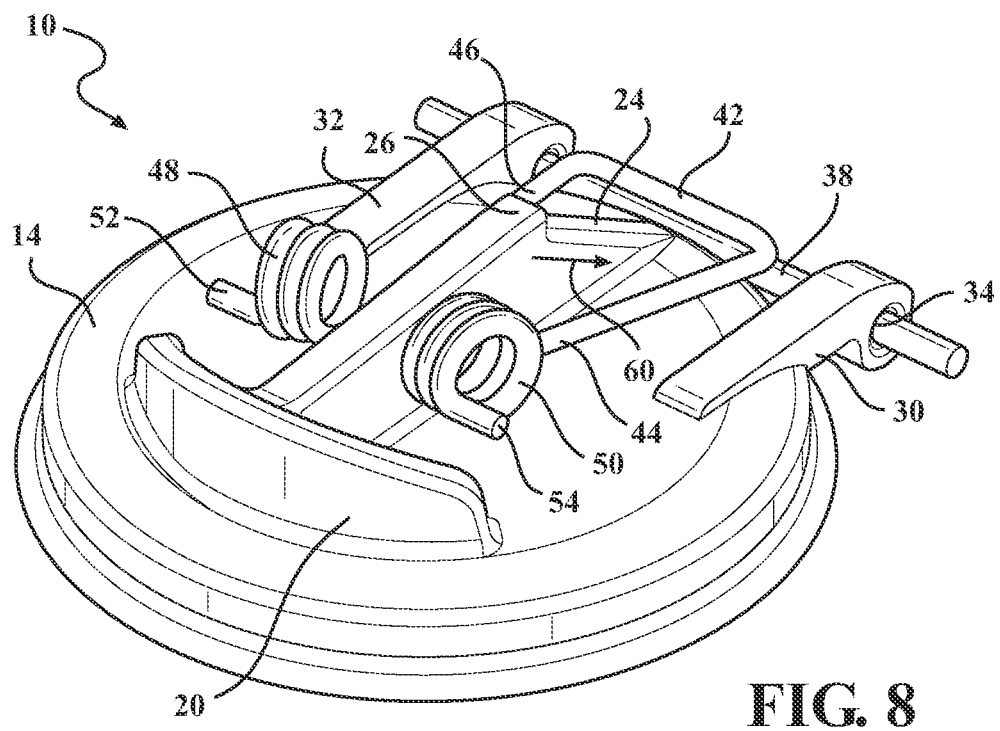
FIG. 8 is a further rotated perspective of the capless door in the open position of FIG. 7 and better showing displaced relationship of the cross-extending central portion of the compound torsional spring in relation to an upper seating location of the slide and the pivot pin for supporting the rotatable capless door.

FIGS. 6-8 depict a series of sectional perspective views of the combination capless door and compound torsional spring, generally at 10, presented in each of closed (FIG. 6) as well as rotated perspective open (FIGS. 7-8) positions. The illustrations of FIGS. 1-5 further depict the capless door in the closed and open positions mounted within an access tunnel housing, such having a circular cross sectional configuration depicted at 12 and which is configured within an external accessible location of the vehicle (not shown) for receiving a fuel nozzle (also not shown).

The capless door includes a body 14 such as depicting a circular disk shape configuration as shown. It is further understood that the capless door can exhibit any desired overall shape not limited to that shown however will in most instances include a sealing gasket or other suitable perimeter extending and biasing surface which is shown at 16 and which, in the fuel door closed position, biases against an interior end wall profile 18 of the housing 12.

The capless door body 14, such as which can be constructed of a rigid polymer or other suitable material, may also include an exposed superstructure including an arcuate projecting portion 20, such being depicted in an outer circumferential surface range of the body 14. A second projecting portion is depicted at 22 which can interconnect with the outer arcuate portion 20 and which further includes a sloping or angled slide profile 24 (also termed an incline plane) extending between an intermediate stopper location 26 configured upon the projecting portion 22 (as further described denoting a spring biasing and door closed position) and a merging end location 28 at which it joins the surface of the door body 14.

As further shown, the body 14 includes a pair of integrated and end projecting supports 30 and 32, these further including aligning rim defined apertures 34 and 36 which receive a crosswise extending pivot pin 38. The pin 38 is in turn mounted to an interior location of the tunnel housing 12 best depicted by the structure 40 shown in FIG. 5 which is integrated into the tunnel housing and which represents an interior projection of the housing which aligns between the pin supports 30/32 of the body 14 in order to provide for unimpeded rotation of the capless door body 14 between the closed and open positions.

Figure 1:
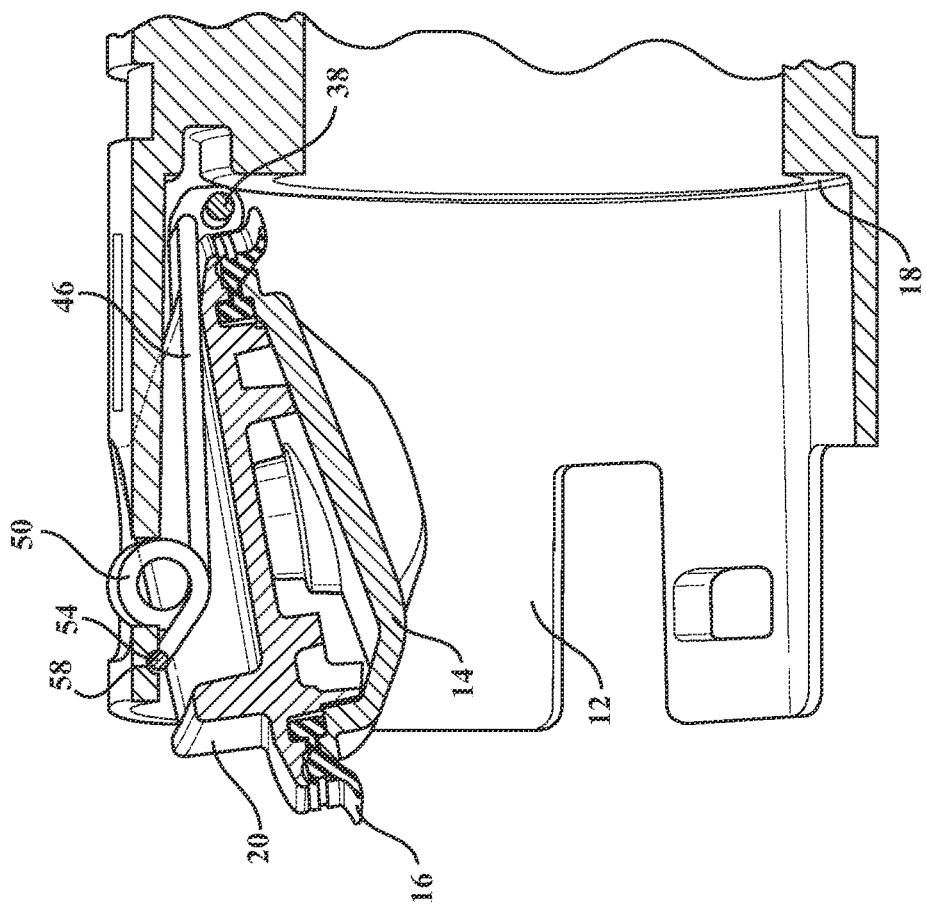
FIG. 1 is a partial cutaway illustration of the capless door assembly in a closed position in which the dual torsional spring biases the door via its supported slide.
Figure 2:
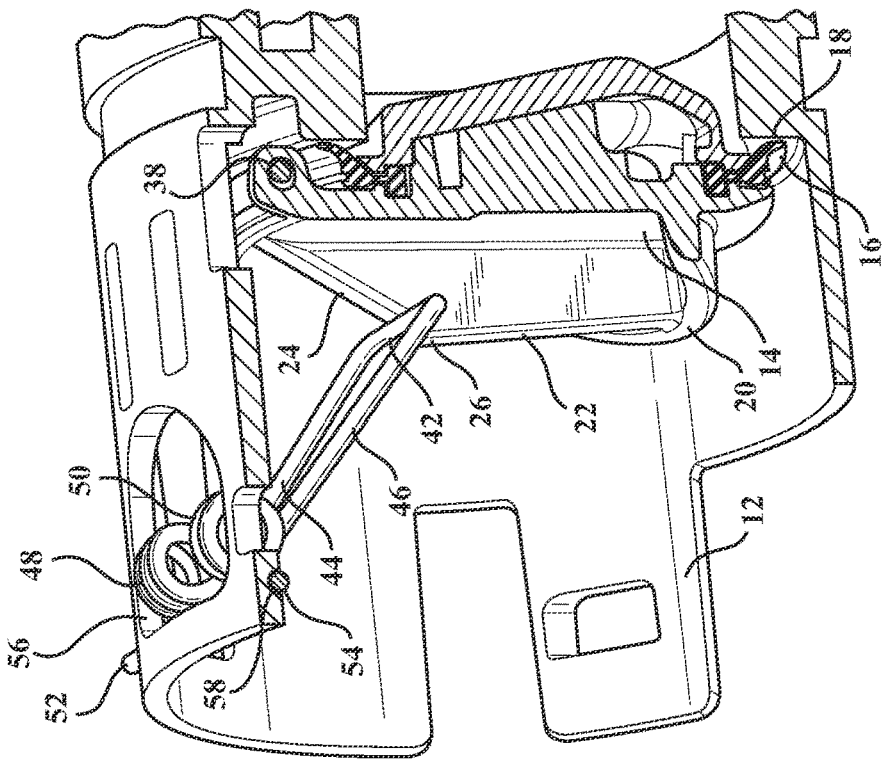
FIG. 2 is a succeeding view to FIG. 1 in which the door is rotated to the open position resulting from the central extending portion of the torsional spring displacing along the capless door supported slide.
Figure 4:
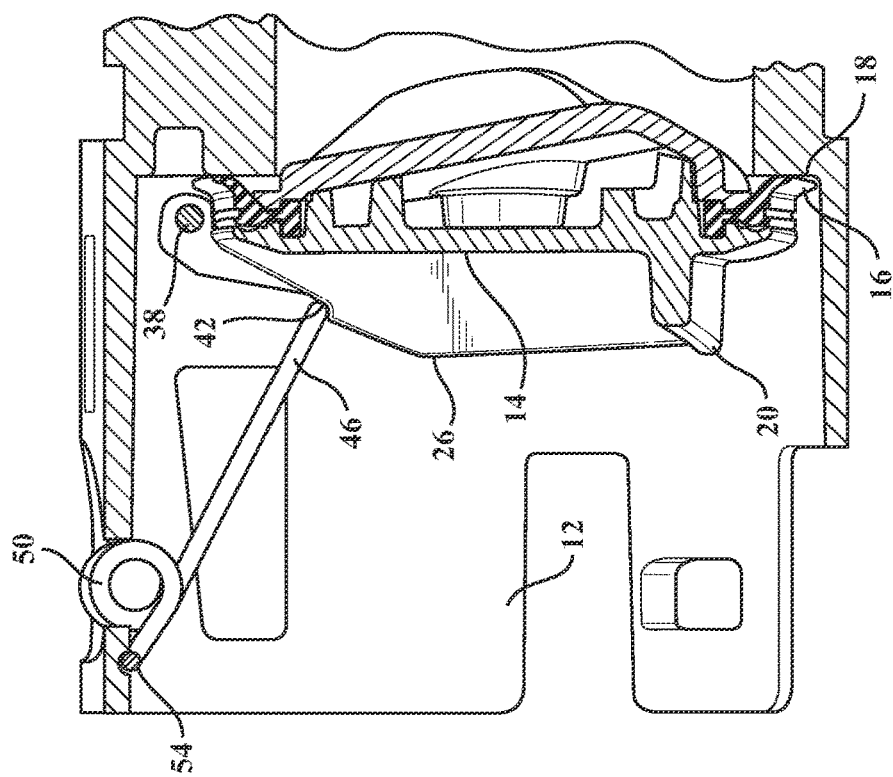
FIG. 4 is a rotated side plan view of the door assembly in the closed position of FIG. 1 and better showing the closure interface with the circular cross sectional housing tunnel within which the door is mounted.
Figure 3:
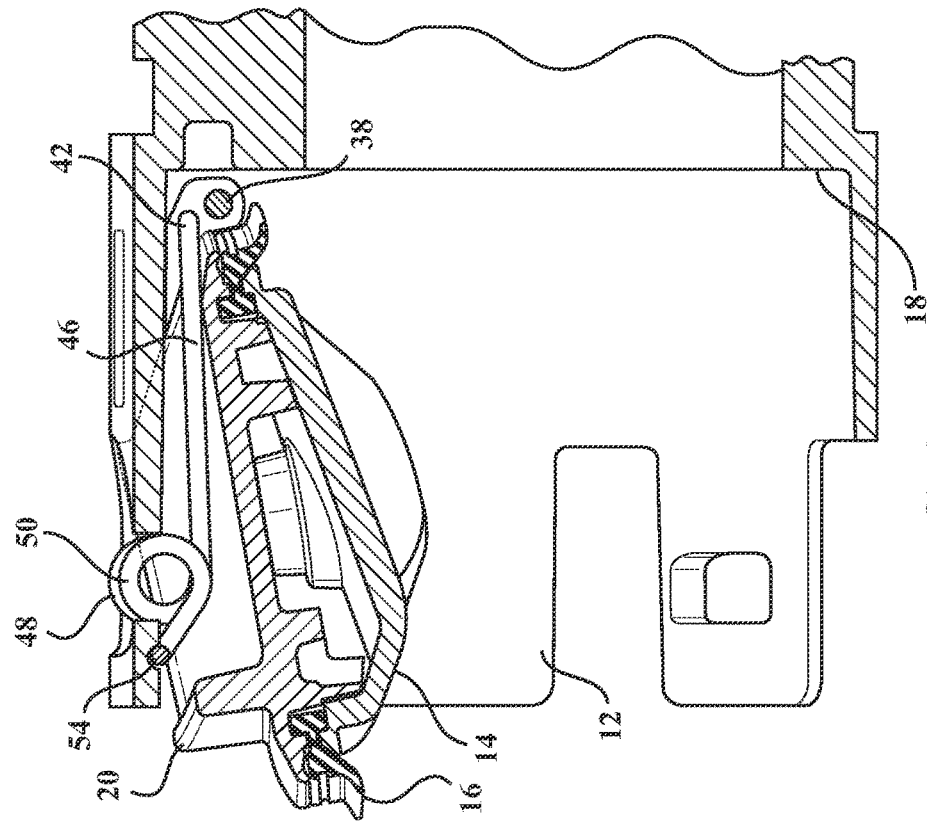
FIG. 3 is a similar illustration to FIG. 2 and again illustrating the capless door in the open position.
Figure 5:
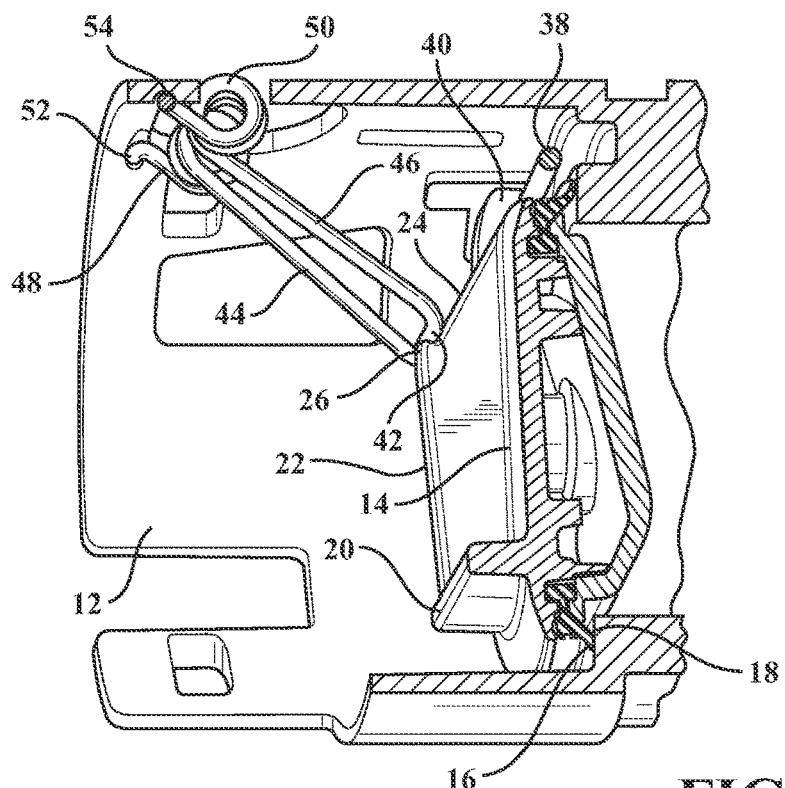
FIG. 5 is a slightly rotated perspective of the door assembly in the closed position and better showing the feature of the spring sliding limiter/stopper.

The torsional spring is depicted by an elongated and multi-bended element exhibiting a generally "U" shaped middle portion 42 with angled side legs 44 and 46 respectively terminating in torsional end windings 48 and 50. The end windings respectively terminate in opposing linear portion 52 and 54. As best shown in FIG. 1, the tunnel housing 12 includes a windowed location (see inner rim 56) which seats the torsional end windings 48/50 concurrent with a pair of circumferential offset inner notches (one of which is shown at 58) for receiving the opposing linear portions 52/54 of the torsional spring ends. The torsional spring profile can have a plurality of sizes and shapes to maintain a desired force on the fuel door to achieve a higher vacuum open point.

Viewing FIGS. 1 and 4-6 collectively, the cross directional extending end portion 42 of the dual torsional spring biases against an elevated end of the angled slide 24 such that it abuts the stopper location 26, with the fuel door 14 configured in the closed position so that its inner perimeter seal 16 abuts the circumferential interior location 18 of receiving housing. In this position, a sufficient closed holding force is exerted against the door so that inadvertent opening the capless fuel door is avoided (such as in the instance of an unintended vacuum force being exerted upon the door exterior by such as a car wash or other activity to which the vehicle is subjected).

Once it is desired to open the capless door 14, the user can grasp an exterior location of the door 14, such as including the circumferential disposed exterior projection 20. Initial pulling on the projection 20 is resisted to a degree by the holding force exerted by the spring location 42 against the stopper end location 26 of the angled slide 24. Continued exerted force will then cause the central spring location 42 to unseat from the end stop location 26 and to begin to travel along the descending angled or inclined slide 24 in a direction towards its downwardly angled upper surface (main surface merged end) which is located proximate to the crosswise directed pivotal support pin 38.

FIGS. 7 and 8 again best show the relationship of the capless fuel door 14 in the upwardly pivoted open position and by which the sliding motion of the central spring location 42 along the descending slide 24 (see directional arrow 60) results in a drop-off of holding force exerted against the door. Upon the door 14 reaching the fully open rotated position, the crosswise extending spring portion 42 seats against an upper perimeter edge of the door 14 in a proximate and parallel disposed relationship relative to the crosswise directed pivoting support pin 38, the torsional loading spring in this position providing a modest open-holding force to the door until the process is reversed and door reverse-rotated to the closed position at which point the biasing force depicted in FIGS. 1 and 6 is reasserted.

Beyond that disclosed, it is understood that the torsional compound spring shown can be alternately constructed in accordance with other shapes and profiles, and not limited to the use of other spring or biasing constructions. In each instance, a crosswise extending middle portion of some design is configured so that it is displaceable along an inclined slider plane between a closed position/end stop location and a further open position location, such as in which an adequate and reverse direction holding force exerted by the spring maintains the capless door in the open position until it is desired to be reclosed by the user.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A capless fuel door assembly, comprising:
    a body movably supported within a housing of a vehicle between closed and opened positions;
    said body including a bottom with a downwardly extending engagement surface; and
    a torsion spring secured to said housing and including an extended middle portion which, when said body is in the closed position, is supported against an end stop location of said engagement surface to urge said body in the closed position, opening said body about said pivot a pivotal support with said housing causing a decrease in a closing force exerted by said torsion spring against said body as said spring displaces away from said end stop location along said inclined engagement surface in a descending outward direction towards the pivotal support to achieve the opened position, with a minimum force established by said torsion spring to maintain the door in the opened position.

2. The invention as described in claim 1, said torsion spring further comprising a pair of torsional end windings extending from said middle portion, with linear end projections of said end windings secured to said housing.

3. The invention as described in claim 2, further comprising an interior window configured within said housing for receiving the torsional windings.

4. The invention as described in claim 1, further comprising a sealing gasket configured about a perimeter of the body for sealing against said housing in the closed position.

5. A capless fuel door assembly, comprising:
- a body movably supported within a housing of a vehicle between closed and opened positions;
- said body including a bottom with a downwardly extending engagement surface; and
- a torsion spring secured to said housing and including an extended middle portion which, when said body is in the closed position, is supported against an end stop location of said engagement surface to urge said body in the closed position, the torsion spring having a pair of torsional end windings with linear end projections received within the housing, an interior window configured within said housing for receiving the torsional windings, opening said body about a pivotal support with said housing causing a decrease in a closing force exerted by said torsion spring against said body as said torsion spring displaces away from said end stop location along said engagement surface in a descending outward direction towards the pivotal support to achieve the opened position, with a minimum force established by said torsion spring to maintain the door in the opened position.

6. The invention as described in claim 5, further comprising a sealing gasket configured about a perimeter of said body for sealing against said housing in the closed position.

7. A capless fuel door assembly, comprising:
- a body movably supported within a housing of a vehicle between closed and opened positions;
- said body including a bottom with a downwardly extending engagement surface extending between an end stop at an intermediate location of said body and a descending outward direction towards a pivotal support of said body; and
- a torsion spring secured to said housing and including an extended and U shaped middle portion supported against said end stop and in order for said torsion spring to urge said body in the closed position, opening said body about said pivotal support causing a decrease in a closing force as said torsion spring displaces along said engagement surface and toward the pivotal support to achieve the opened position, with a minimum force established by said torsion spring to maintain the door in the opened position.

8. The invention as described in claim 7, further comprising the torsion spring having a pair of torsional end windings with linear end projections received within said housing.

9. The invention as described in claim 8, further comprising an interior window configured within said housing for receiving the torsional windings.

10. The invention as described in claim 7, further comprising a sealing gasket configured about a perimeter of said body for sealing against said housing in the closed position.

* * * * *